United States Patent [19]

Shiota et al.

[11] Patent Number: 4,933,773
[45] Date of Patent: Jun. 12, 1990

[54] PHOTOGRAPHIC PRINTING METHOD AND APPARATUS THEREFOR

[75] Inventors: Kazuo Shiota; Kiichiro Sakamoto, both of Kanagawa, Japan

[73] Assignee: Fuji Photo Film Co., Ltd., Kanagawa, Japan

[21] Appl. No.: 249,159

[22] Filed: Sep. 26, 1988

[30] Foreign Application Priority Data

Sep. 24, 1987 [JP]  Japan .................. 62-239578
Oct. 7, 1987 [JP]  Japan .................. 62-253237

[51] Int. Cl.⁵ .................. H04N 1/21; H04N 1/46; G01D 9/42; G03B 27/465
[52] U.S. Cl. .................. 358/302; 358/78; 346/107 R; 355/20; 355/29; 355/45; 355/32; 355/67; 355/71
[58] Field of Search ............. 358/296, 302, 75, 78, 358/244; 346/110 R, 107 R; 355/20, 29, 44, 45, 64, 65, 66, 32, 67, 71; 364/943.3, 927.631, 927.632

[56] References Cited

U.S. PATENT DOCUMENTS

| 4,067,650 | 1/1978 | Spence-Bate | 346/110 R |
|---|---|---|---|
| 4,373,194 | 2/1983 | Demke | 346/900 |
| 4,575,766 | 3/1986 | Birnbaum | 358/244 |
| 4,580,167 | 4/1986 | Diete | 358/302 |
| 4,729,032 | 3/1988 | Nishiyama | 358/244 |
| 4,752,823 | 6/1988 | Takahashi | 358/244 |
| 4,780,756 | 10/1988 | Shiota | 358/78 |
| 4,794,460 | 12/1988 | Shiota | 358/244 |

FOREIGN PATENT DOCUMENTS 58-122529 7/1983 Japan .
61-122639 6/1986 Japan .

Primary Examiner—Bruce A. Reynolds
Assistant Examiner—Scott A. Rogers
Attorney, Agent, or Firm—Sughrue, Mion, Zinn, Macpeak & Seas

[57] ABSTRACT

Video images of each frame of a roll of film are stored in a first memory when printing the frames on a photographic material. Thereafter, the images are read out from the first memory for image processing and written in a designated area of a second memory. Video signals for a number N of frames are written in memory area of the second memory designated for the respective frames to provide composite video signals and then are read out to be printed as a composite image on a photographic material as an index print. When printing each frame of the roll of film, a first mirror is removably inserted into a printing path to project an image of the frame to a TV camera in order to provide three color video signals. Video signals for several frames are electrically composed to provide composite video signals which are printed as a single composed image having reduced images inlaid in a matrix on a photographic paper.

12 Claims, 7 Drawing Sheets

PHOTOGRAPHIC PRINTING METHOD AND APPARATUS THEREFOR

BACKGROUND OF THE INVENTION

The present invention relates to a photographic printing method and an apparatus therefor and more particularly to a printing method of making a print of a composite image and an apparatus for performing the composite image printing method.

Composite image prints, such as index prints having reduced size images from frames of a roll of negative film, have been used for demonstrating the contents of the negative film. One such index print is disclosed in Japanese Unexamined Patent Publication No. 61-122,639. For making such an index print, a roll of negative film is divided into a plurality of film strips. The film strips are placed in a negative carrier in the order in which the film strips are arranged in a negative holder. The film strips are pressed down by a framing mask and illuminated from the back so that they are projected onto a photographic paper with reduction by a printing lens.

It has been necessary to use an extra printer for making such index prints in addition to using a printer for making enlarged prints of respective frames of a negative film. Having to use two printers has made it quite troublesome and time consuming to make enlarged prints and index prints.

Otherwise, in order to make such index prints, a photographic printer incorporating a CRT display such as disclosed in Japanese Unexamined Patent Publication No. 58-122,529 may be used. The photographic printer has a mirror disposed between a light source and a film carrier. The mirror, which is inserted into and removed from the printing path of a printing lens, projects a video image displayed on a CRT onto the photographic paper when the mirror is in the printing path. When the mirror is removed from the printing path, an image on a frame of a negative or a reversal film placed in the film carrier is projected onto the photographic paper. Since this photographic printer is originally provided to selectively make prints of images on a film and a video image on the CRT, it is necessary to receive video signals of images on frames of the film by means of an extra light source and image reading means before printing. Recording video signals is disadvantageous in regard to the required printing work and the resulting printing cost.

OBJECT OF THE INVENTION

It is, therefore, an object of the present invention to provide a photographic printing method for easily making a print of composite image such as an index print.

It is another object of the present invention to provide a photographic printer for making a print of video composite image displayed on a CRT.

It is still another object of the present invention to provide a photographic printer in which images on frames of a film are displayed as a composite video image on a CRT and printed on photographic paper.

SUMMARY OF THE INVENTION

For accomplishing the above objects, a photographic printing method of making prints comprises the steps of memorizing video image signals of each frame of a roll of film in a first memory upon printing an image of each frame on a photographic material; writing, after having image-processed, the video image signals of each frame read out from the first memory in a designated area of a second memory to electrically compose the video image signals of the frames as composite video image signals; and printing the composite video image signals read out from the second memory as an inlaid composite image on said photographic material as a hard copy every time the video image signals of a predetermined number N (positive integer) of frames of the roll of film are written in the second memory.

According to the photographic printing method of a preferred embodiment of the present invention, the printing of the composite video image signals read out from the second memory as an inlaid composite video image on the photographic material is effected after video image signals of the last frame of the roll of film are written in a designated area of the second memory.

According to the photographic printing method of another preferred embodiment of the present invention, the printing of the composite video image signals read out from the second memory as an inlaid composite video image on the photographic material every time video image signals of a predetermined number N (positive integer) of frames of the roll of film are written in the second memory and after video image signals of the last frame of the roll of film are written in the second memory.

The above objects of the present invention are also accomplished by providing the photographic printing apparatus comprising an illumination light source for illuminating an original held by an original carrier from the back of said original; a printing lens for projecting an image of the illuminated original onto a photographic material; a first mirror removably positioned into a printing path between the original carrier and the printing lens for reflecting light passed through the original held by the original carrier; a TV camera for detecting the reflected light to provide video signals for each frame of the original; means for electrically composing the video signals of a plurality of frames as composite video signals; a CRT for displaying said composite video signals as an inlaid composite video image thereon; and second mirror removably positioned into a printing path between the printing lens and said photographic material for reflecting the inlaid composite video image displayed on said CRT to print it onto the photographic material.

BRIEF DESCRIPTION OF THE DRAWINGS

The present invention now will be described in detail with reference to the accompanying drawings, in which.

DETAILED DESCRIPTION OF THE INVENTION

Figure 1:
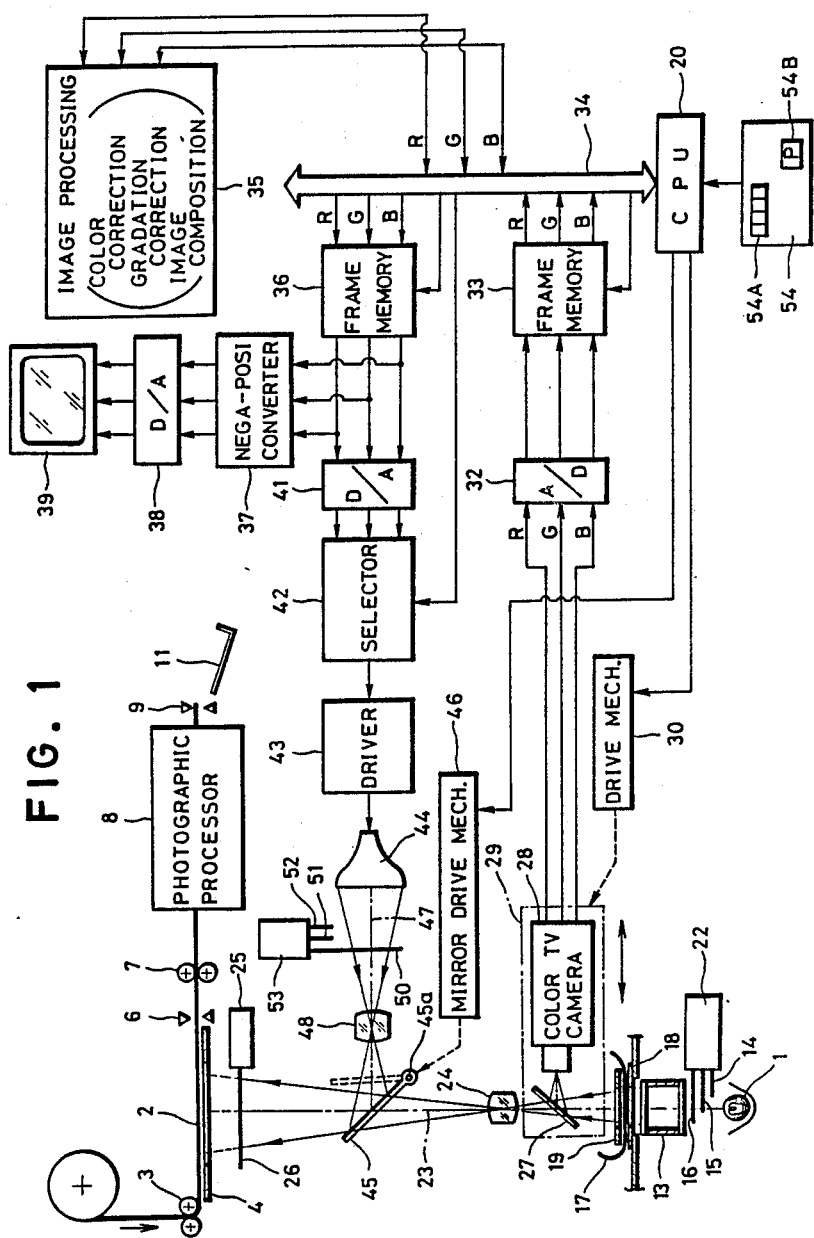
FIG. 1 is a schematic block diagram showing the photographic printer according to a preferred embodiment of the present invention.

FIG. 1 shows a photographic printer according to a preferred embodiment of the present invention. Confronting a white light source, such as an illumination lamp 1, there is a photosensitive material such as a color photographic paper 2 in the form of a roll which is withdrawn by means of a pair of rollers 3 to be placed in an exposure position defined by a framing mask 4. After the exposure of a predetermined number of frames, the exposed photographic paper 2 is cut in single strips by a cutter 6 and the strips are sent to a photographic processing section 8 by a pair of rollers 7. In the photographic processing section 7, each single strip of exposed photographic paper 2 is processed appropriately, and is then cut to individual prints by a cutter 9. These prints are delivered to an external tray 11.

Above the white light source 1, there is a mirror box 13 which comprises a square hollow tube having inferior mirrored walls and top and bottom diffusion plates. Between the white light source 1 and the mirror box 13 there are three complementary color filters, namely cyan, magenta and yellow filters 14, 15 and 16, respectively. Each color filter 14, 15, 16 is controllably insertable into the light path independently of the other two. The white light from the lamp 1 passes through the control filter 14, 15 or 16 into the mirror box 13 and is diffused thereby. The diffused light, after passing through a color original or color negative film 17 placed between a film carrier 18 and a framing mask 19 so as to be held flat in an exposure position, is focused on the color paper 2 by means of a film image printing lens 24. A filter controller 22 controls each complementary color filter 14, 15, 16 to move from its starting position toward the inside or outside of the illumination light path 23, thereby adjusting the proportion of the three color components of the printing light according to an image on the color negative film 17 (which is hereinafter referred to as a negative image) to thereby print a positive image (an image on positive film) on a reversal color paper using an extra developing reagent.

The film image printing leans 24, which is disposed in the printing light path between the color negative film 17 and the color paper 2, projects the negative image onto the color paper 2 to create a latent image of the negative image under the control of a shutter 26 actuated and controlled by a shutter controller 25.

A color TV camera 28, with its associated first reflection mirror 27, is supported by a carrier table 29, shown by a dotted line, which is horizontally moved by a driving mechanism 30 controlled by a CPU 20 so as to place the first reflection mirror 27 in and out of the printing light path 23. The mirror 27 is placed at an angle of, for example in this embodiment, approximately 45° with respect to the optical axis of the film image printing lens 24 in the printing light path 23. The carrier table 29 is retracted when printing a negative image. The first reflection mirror 27 in the printing path 23 reflects the illumination light and directs it toward the color TV camera 28. The color TV camera receives the color negative image of the color negative film 17 and produces color video signals R, G and B for red, green and blue, respectively. These three color video signals R, G and G are separately sent to an A/D converter 32 to be converted into a digital form.

A frame memory 33 comprises three frame memories, one for each color, to store therein the three color video signals R, G and B. Reading in and reading out the three color video signals from the frame memory 33 is effected by address signals from the CPU 20. The color video signals R, G and B read out are transferred to an image processing section 35 through a bus line 34. If reducing the size of an image, the three color video signals R, G and B are read out and thinned.

In the processing section 35, the three color video signals R, G and B are processed for color and/or gradation correction. The processed color video signals R, G and B are thereafter sent to another frame memory 36 through the bus line 34 and stored in designated areas. The frame memory 36, which comprises three frame memories one for each color similar to the frame memory 33, is provided in order to store video signals of a composite video image in which a predetermined number of frames are inlaid. It is preferable to inlay a number at a corner of each inlaid frame. For this inlaid frame number, the CPU 20 writes data of frame numbers in the frame memory 36.

Video signals read out from the frame memory 36 are sent to both a monitoring system and a printing system. The monitoring system comprises a negative-to-positive reversal circuit or converter 37, a D/A converter 38, and a color monitor such as a color CRT 39 driven by a monitor driver (not shown). On the color CRT 46, an inlaid composite video image to be printed is displayed as a color positive image. On the other hand, the printing system comprises a D/A converter 41, a selector 42 controlled by the CPU 20 to selectively transfer three color signals of the inlaid composite video image signals, a CRT driver 43, and a CRT 44. In the case of taking an image on a color reversal film, three color video images are processed for positive- to-negative reversal in the image processing section 35.

Between the framing mask 4 and the film image printing lens 24, there is a second reflection mirror 45 in cooperation with a mirror drive mechanism 46. The mirror 45 is rotatable about an axis 45A so that it may be rotated into the printing light path 23 at an angle of 45° with respect to the printing light path 23 so as to reflect and direct the light from the CRT 44 toward the shutter 26 when printing a negative image and be rotated out of the printing light path 23. In a printing light path 47 between the second reflection mirror 45 and the CRT 44, there are three primary color filters, namely red, green and blue filters 50, 51 and 52, respectively, driven by their associated filter controller 53 to move into and out of the printing light path 47 so as to perform additive frame sequence printing.

A keyboard 54 including index print format selection keys 54A and a power switching key 54B, enters necessary instructions into the CPU 20. The CPU 20 performs a programmed sequence operation for controlling the lamp 1, the filter drivers 22 and 53, the drive mechanism 30, the frame memories 33 and 36, the image processing section 35, the selector 42, the mirror driver mechanism 46, etc.

Figure 2:
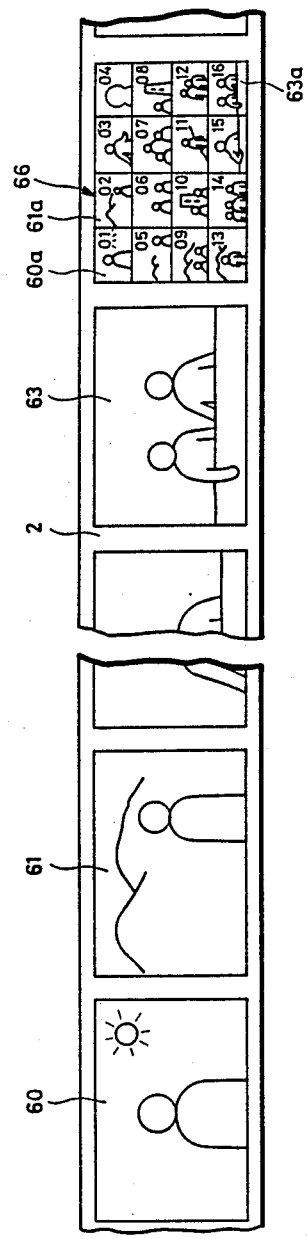
FIG. 2 is an illustration showing a photographic paper on which frames of a negative film are printed.
Figure 3:
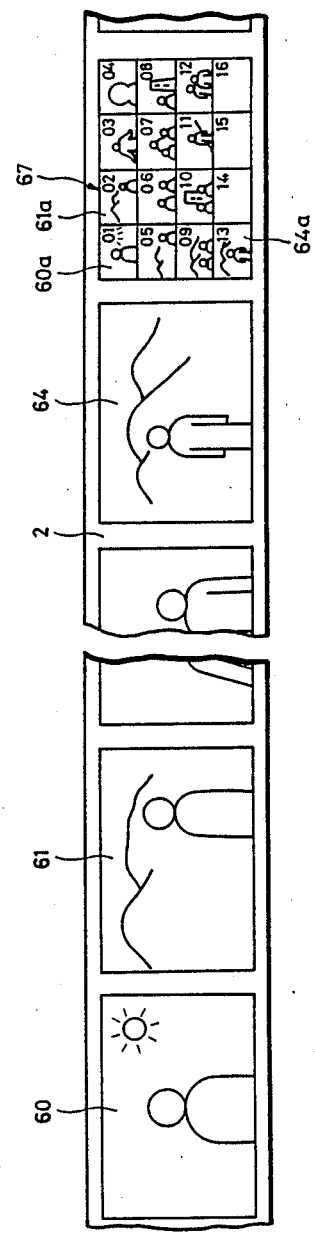
FIG. 3 is an illustration showing a photographic paper printed by a sequential operation shown in FIG. 6 embodying the printing method according to a preferred embodiment of the present invention.

FIGS. 2 and 3 show exposed color photographic papers 2, on which frames 60. 61. 63 and 64 are formed. The frames 66 and 67 are printed as index prints by exposing the color photographic paper 2 to the CRT 44 on which a number of frames of the color negative film 17 are displayed as an electrically composite video image. Frames 60a, 61a, 63a, and 64a are reduced in size from the numerically corresponding frames 60. 61 63 and 64. The frames such as 60a, 61a, 63a and 64a are inlaid in a single composite image frame 64, 67 as an index print and are arranged in, for example, a 4×4 matrix. Therefore, two index prints are provided for a 24-exposure roll of film, and three index prints are provided for a 36-exposure roll of film. Alternatively, it is possible to use various matrices such as a 4×4 matrix for a 12-exposure roll of film, a 5×5 matrix for a 24-exposure roll of film, and a 6×6 matrix for a 36-exposure roll of film.

Figure 4:
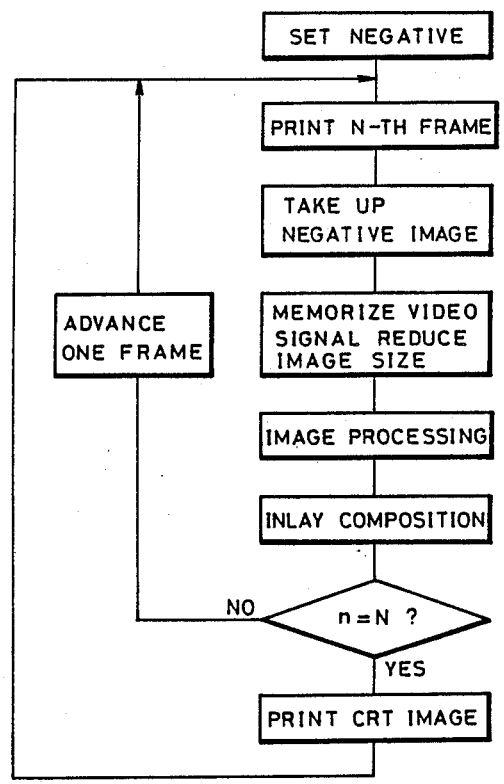
FIG. 4 is a flow chart showing a sequential operation embodying the printing method according to another preferred embodiment of the present invention.

FIG. 4 shows a flow chart for explaining the sequential operation of the photographic printer shown in FIG. 1. The color negative film 17, as an original, is set in the film carrier 18 to place the first frame of the color negative film 17 in the exposure position and is pressed down by the framing mask 19. Ordinarily, the complementary color filters 14–16 are in their starting or standard positions so that the printing light from the illumination lamp 1 which is dimmed is adjusted to a standard proportion of the three color components of the printing light. The filter controller 22 automatically controls the positions of the color filters 14–16 according to values measured by a scanner (not shown but well known in the art).

The print key 54B of the keyboard 42 is operated to start printing operation, exciting the illumination lamp 1 to emit light at its full capacity and causing the shutter 26 to open for a certain time period so that a latent image of a negative image is formed in the color photographic paper 2 by the film image printing lens 24.

After printing of one frame of the color negative film 17, the CPU 20 causes the illumination lamp 1 to dim and causes the rollers 3 to withdraw the photographic color paper 2 by one frame. Simultaneously, the CPU 20 demands the filter controller 22 to return the color filters 14–16 to their starting positions and the drive mechanism 30 to move the carrier table 29 to the left as viewed in FIG. 1, so as to place the first reflection mirror 27 in the printing light path 23 at an angle of 45°.

The light from the illumination lamp 1 passed through the color negative film 17 is reflected by the first reflection mirror 27 and is directed to the color TV camera 28. The color TV camera 28 provides three color video signals and sends them to the A/D converter 32 for analog-to-digital conversion. These three color video signals thus converted are stored in the frame memorY 33 separately by color. When an index print format is selected to provide 16 inlaid image frames in a single composite image frame for an index print, the CPU 20 addresses the frame memory 33 to read out in reduced form the three color video signals one sixteenth from the frame memory 33. The number N of inlaid frames to be in a single composite image frame may be set to value $m^2$ (m is any positive integer), for example "25", "36", etc.

The color video signals read out from the frame memory 33 are transmitted to the image processing section 35 through the bus line 34 so that the video signals of each frame is image processed to be appropriately corrected in color and gradation. Thereafter, the three color video signals are sent to the first frame memory 36 through the bus line 34 and are stored in a memory area of the first frame memory 36 designated by the CPU 20. In accordance with the designation of memory area where video signals are stored, a predetermined number N of images are reduced in size and are inlaid as composite video image signals in the first frame memory 36 for providing a single composite image. After this inlaying of images, the CPU 20 sends an instruction signals to read out the composite video signals from the first frame memory 36 in the order of frame number. The composite video image signals are sent to the color monitor 39 through the negative-to-positive conversion circuit 37 and the D/A converter 3B and are displayed as a color composite image having the predetermined number N of inlaid images on the screen of the color monitor 39.

After having written three color video signals in the frame memory 36, the CPU 20 causes the drive mechanism 30 to retract the carrier table 29 so as to remove the first reflection mirror 27 out of the printing path 23. If printing several other frames of the color negative film 17 and making an index print of the other frames, the same procedure as described above is repeated frame by frame.

After exposing all of the predetermined number of frames of the color negative film 17 on the color paper 2, the cutter is actuated to cut the exposed color photographic paper 2 into an exposed print strip. The print strip is transported by the rollers 7 to the photographic processing section 8 to be developed. Thereafter, the developed print strip is cut by the cutter 9 into individual prints and is delivered into the tray 11.

Every time a predetermined number N, for example 16, of frames of the color negative film 17 are exposed, the inlaid arrangement of component images of an inlaid composite image with frame numbers 66 are displayed on the color monitor 39 for a visual inspection. When printing the composite video image to provide an index print, an instruction is entered through the keyboard 39 to begin printing. Consequently, the CPU 20 causes the mirror drive mechanism 46 to turn the second reflection mirror 45 and place it at an angle of 45° in the printing path 23. The CPU 20 reads out composite video signals from the frame memory 36 and sends them to the printing system. The composite video signals are converted into an analog form by the D/A converter 41. The selector 42 selectively transmits the analog video signals for, for example, red first to the black-and-white CRT 44 through the driver 43 to repeatedly display the video signals of a red negative composite video image as a black-and-white image in a brightness pattern on the black-and-white CRT 44. During the display of the black-and-white image, the CPU 20 causes the filter controller 53 to insert the red filter 50 into the printing path 23 to transform the black and-white image projected onto the color photographic paper 2 by the CRT image printing lens 48 into a red image. Then, the CPU 20 causes the shutter controller 25 to open the shutter 26 for an appropriate time period determined according to the sensitivity of the color photographic paper to red, forming a red latent image in the color photographic paper 2.

After an appropriate time period, the shutter 26 is closed and the red filter 50 is replaced with the green filter 51. Simultaneously, the selector 49 selectively transmits the digital composed video signals for green to display the video signals as a black-and-white image in a brightness pattern on the black-and white CRT 44. Thereafter, the CPU 20 controls the shutter controller 25 to open the shutter 26 again for an appropriate time period determined according to the sensitivity of the color photographic paper 2 to green, forming a green latent image over the red latent image in the color photographic paper 2. In the same way, a blue latent image is formed over the red and green latent images in the color photographic paper 2. As a result, a composite color latent image, including color latent images of sixteen frames of the color negative film 11, is formed in a three color frame sequential exposure as shown in FIG. 2. Thus, the video image printing or index printing mode is completed. This video image printing mode is conducted to form the composite image every predetermined number of frames.

Figure 5:
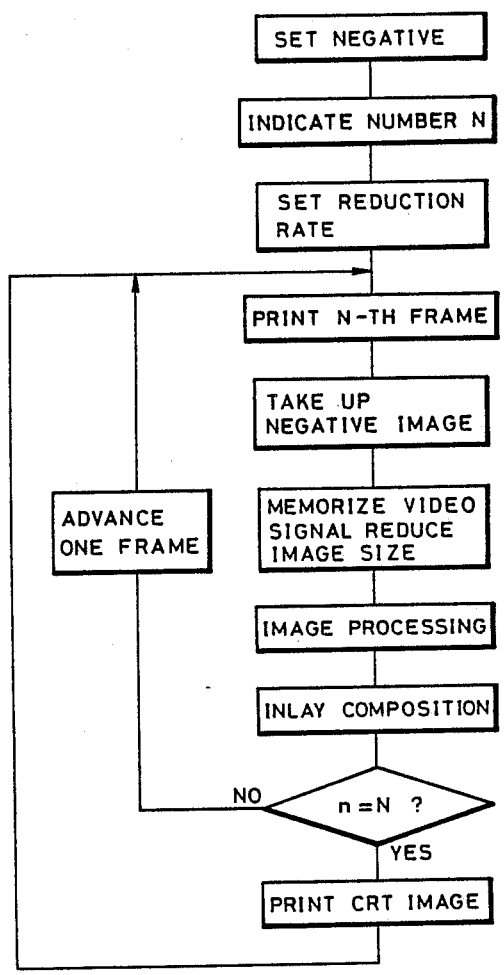
FIG. 5 is a flow chart showing a sequential operation embodying the printing method according to still another preferred embodiment of the present invention.

FIG. 5 shows a flow chart in which the size of each frame of a composite image frame is varied according to the number of inlaid frames. In this embodiment, after placing the color negative film 17 in the exposure position, one of the index print format selection keys 54A of the keyboard 54 is operated to select a number N (=m×m) of inlaid frames, for example 9 (=3×3), 16 (=4×4), 25 (=5×5), etc. The CPU 20 reads out video signals reduced according to the selected number N to reduce the size of each component image. Thereafter, the same procedure as described in association with FIG. 4 is taken. When, for example, an index print format of 4×4 matrix is selected, printing of an index print begins upon the completion of printing of the sixteenth frame of the color negative film 17.

Figure 6:
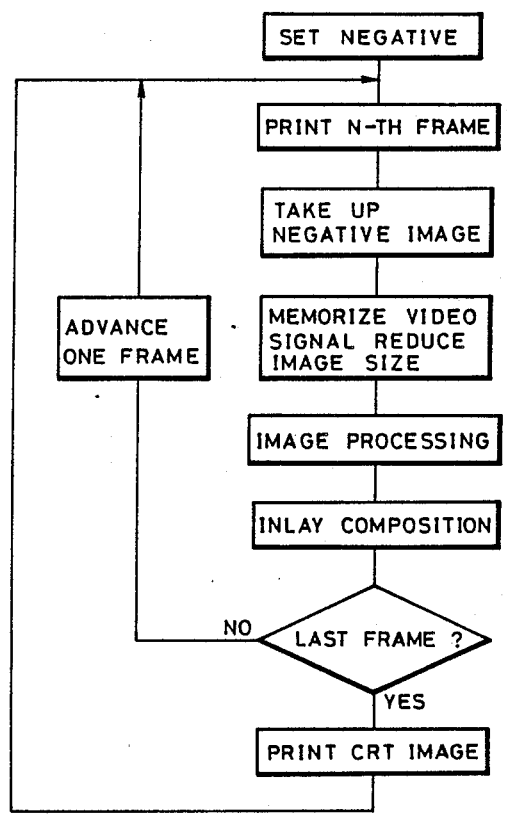
FIG. 6 is a flow chart showing a sequential operation embodying the printing method according to yet another preferred embodiment of the present invention.

FIG. 6 shows a flow chart in which all of frames of a roll of film are printed in an index print as a single composite image. In this embodiment, an index print format of 7×6 matrix is selected for a 36-exposure roll of film because 36-exposure rolls of films usually have 37 or 38 available frames. A composite image is printed when the last frame of a roll of film is detected regardless of the number of inlaid frames. Detecting the last frame of a roll of film is effected by a sensor disposed on the film carrier 18. In the case of a plurality of rolls of films connected in a single long web by a connecting tape, the last frame of each roll of film is detected by sensing the tape by the sensor.

Figure 7:
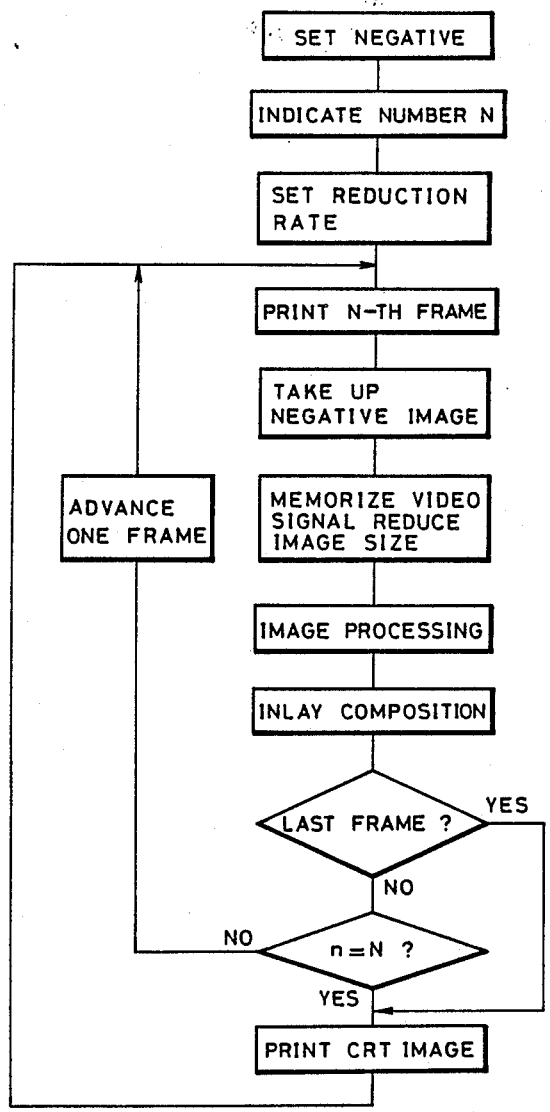
FIG. 7 is a flow chart showing a sequential operation embodying the printing method according to a further preferred embodiment of the present invention.
Figure 8:
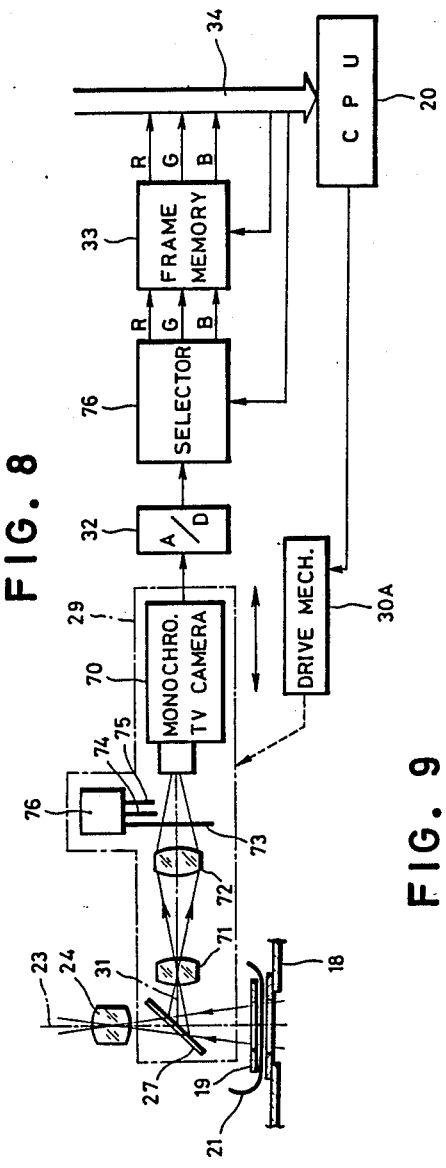
FIG. 8 is a partial schematic illustration of the photographic printing apparatus according to another preferred embodiment of the present invention.

FIG. 7 shows a flow chart in which the embodiments of FIGS. 5 and 6 are combined. In this embodiment, frames of a roll of film are printed frame by frame. A composite CRT image is printed every time the number N of frames are inlaid. If the sensor detects the last frame of the roll of film, the last composite CRT image of the roll of film is printed even though it contains less than N frames. FIG. 3 illustrates a print made according to a sequential operation shown in FIG. 7 of which an index image frame 67 contains 13 frames of a roll of film. As is apparent, if making a print from a 24-exposure roll of film and an index print format of 16 frames is selected, two index prints are provided, one contains 16 inlaid frames and the other contains eight inlaid frames and eight blank frames. FIG. 8 partly shows a printing apparatus according to another preferred embodiment of the present invention in which a black-and-white TV camera 70 is used. Between the black-and-white TV camera 70 and the first reflection mirror 27, there are a focusing lens 71, a field lens 72 and a color separation filter assembly comprising red, green and blue filters 73. 74 and 75, respectively, positioned in front of the black-and-white TV camera 70 independently of the other two. The three color filters 73–75 are controlled by a filter controller 76 to be positioned in front of the TV camera lens one after another so as to receive negative image in three color frame sequentially. The negative image taking means, comprising the first reflex mirror 27, the focusing and field lenses 71 and 72, the color separation filter assembly and the black-and-white TV camera 70, is structured as one unit and is held by the carrier table 29 which is horizontally moved back and forth by a drive mechanism 30A controlled by the CPU 20. Video signals from the black-and-white are retrieved by color and are sent to the frame memory 33 separated by color through a selector 76.

Figure 9:
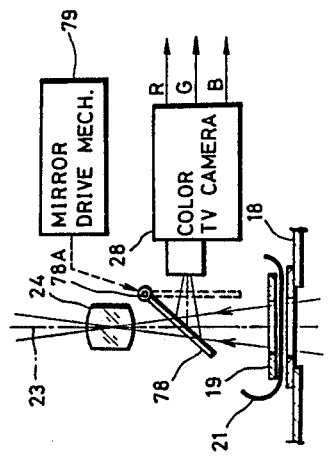
FIG. 9 is a partial schematic illustration of the photographic printing apparatus according to still another preferred embodiment of the present invention.

FIG. 9 shows a printing apparatus according to still another preferred embodiment of the present invention in which a swingable first reflection mirror 78 is used. The first reflection mirror 78 is mounted on a pivot 78A and controlled by a mirror drive mechanism 79 to swing in the printing path 23 between the film carrier 18 and the film image printing lens 24 at an angle of 45° and out of the printing path 23. The first reflection mirror 78, when in the printing path at an angle of 45°, reflects the light passed through the negative film 17 toward the color TV camera 28.

It is permissible to print a composite video image of a plurality of the same negative images of a roll of film on a photographic paper in place of printing a composite video image of a plurality of different negative images. Furthermore, it is possible to display a composite video image of a single negative image, and a letter image entered through a keyboard or the like or a computer graphic image provided by a digitizer on the CRT 44 and print the composite video image onto a photographic paper 2.

The photographic printing apparatus of the present invention may be used to print a video image. This is made possible by providing a video image input device to display video signals of the video image on the CRT 44 after having image processed the video signals in color and gradation in the image processing section 35.

The printing method of the present invention can be applicable to a photographic printer of the type having a CRT as a negative film illumination light source and a film carrier attachable to the illumination CRT. In such a photographic printer, it is possible to print a video image displayed on the illumination CRT by only removing the film carrier with a negative film or original from the illumination CRT.

It is convenient to provide film advancing means attached to the film carrier 18 to automatically advance the film by one frame every exposure.

According to the printing method of the present invention, because it repeatedly occurs to receive image signals of a frame of a roll of film, write the image signals in a first memory, read out the image signals from the first memory, and write again the image signals but into a second memory, in this order, until image signals of a predetermined number N of frames of the roll of film are electrically composed and inlaid as single composite image signals, and every time the composite image signals of the predetermined number N of frames are provided and when the last frame of the roll of film is detected, the composite image signals are retrieved from the second memory and are printed on a photographic material, a print of a composite image such as an index print is easily made. Furthermore, because image signals of a negative image of a film are taken immediately after or before printing the negative image, a print of a composite image such as an index print can be efficiently made.

According to the printing apparatus of the present invention, because image signals of frames of a roll of film are taken by the first mirror removably positioned in the printing path between the printing lens and the film carrier and are electrically composed so as to provide inlaid composite image signals to be displayed as an inlaid composite image on the CRT. and the inlaid composite image is projected by the second mirror removably positioned between the printing lens and the photographic material onto the photographic material, it is quite easy to selectively print an image of a frame of an original and an composite image having inlaid images of several frames of the original. Owing to the provision of the first mirror removably positioned between the printing lens and the original carrier, it is not necessary to remove the printing lens every time image signals of a frame of the original are to be received, resulting in a quick printing work.

Although the present invention has been fully described by way of the preferred embodiments thereof with reference to the accompanying drawings, it will be apparent to those skilled in the art that various changes and modifications of the embodiment are possible without departing from the scope of the invention.

What is claimed is:

1. A photographic printing method of making prints of a plurality of frames of a roll of film, which comprises the steps of;
   memorizing video image signals of each of said frames in a first memory upon printing said image of said each frame on a photographic material;
   storing said video image signals of said each frame read out from said first memory in a designated area of a second memory to electrically compose said video image signals of said plurality of frames as composite video image signals; and
   printing said composite video image signals read out from said second memory as an inlaid composite image on said photographic material every time said video image signals of a predetermined number of said frames of said roll of film are stored in said second memory.

2. A photographic printing method as defined in claim 1, wherein said predetermined number is variably set.

3. A photographic printing method as defined in claim 1, wherein each image to be inlaid in said composite image is reduced in size by reducing video image signals of said each image upon being read out from said first memory.

4. A photographic printing method as defined in claim 3, wherein said predetermined number of frames is selected among a plurality of numbers previously prepared.

5. A photographic printing method of making prints of a plurality of frames of a roll of film, which comprises the steps of:
   memorizing video image signals of each of said frames in a first memory upon printing said image of said each frame on a photographic material:
   storing said video image signals of said each frame read out from said first memory in a designated area of a second memory to electrically compose said video image signals of said plurality of frames as composite video image signals; and
   printing said composite video image signals read out from said second memory as an inlaid composite image on said photographic material after video image signals of the last frame of said roll of film are written in a designated area of said second memory.

6. A photographic printing method of making prints of a plurality of frames of a roll of film, which comprises the steps of:
   memorizing video image signals of each of said frames in a first memory upon printing said image of said each frame on a photographic material;
   storing said video image signals of said each frame read out from said first memory in a designated area of a second memory to electrically compose said video image signals of said frames as composite video image signals; and
   printing said composite video image signals read out from said second memory as an inlaid composite image on said photographic material every time video image signals of a predetermined number of said frames of said roll of film are written in said second memory and when video image signals of the last frame of said roll of film are written in said second memory.

7. A photographic printing method as defined in claim 1, wherein a print of said inlaid composite image is an index print including images of said frames arranged in a matrix.

8. A photographic printing apparatus comprising;
   illumination light source for illuminating a frame of an original held by an original carrier from the back of said frame;
   printing lens for projecting an image of said illuminated frame onto a photographic material;
   a first mirror removably positioned into a printing path between said original carrier and said printing lens for reflecting light passed through said frame held by said original carrier;
   a TV camera for detecting said reflected light to provide video signals for each frame of said original;
   means for electrically producing composite video signals containing distinct images of a plurality of said frames;
   a CRT for displaying said composite video signals as an inlaid composite image thereon; and
   second mirror removably positioned into a printing path between said printing lens and said photographic material for reflecting said inlaid composite image displayed on said CRT to print said image onto said photographic material.

9. A photographic printing apparatus as defined in claim 8, wherein said first mirror and said TV camera are movable as one unit so as to position said first mirror into and out of said printing path.

10. A photographic printing apparatus as defined in claim 8, wherein said TV camera is a black-and-white TV camera with its associated three primary color filters, each being positioned between said first mirror and said TV camera independently of the other two, for three color separation of said detected light.

11. A photographic printing apparatus as defined in claim 8, wherein said first mirror is mounted for pivotal movement into and out of said printing path.

12. A photographic printing apparatus as defined in claim 9, wherein said TV camera is a black and white TV camera with its associated three primary color filters, each being positioned between said first mirror and said TV camera independently of the other two, for three color separation of said detected light.

* * * * *